(12) United States Patent
Spurgeon

(10) Patent No.: US 7,657,400 B2
(45) Date of Patent: Feb. 2, 2010

(54) SLIDING MODE METHOD FOR PREDICTIVE DIAGNOSTICS

(75) Inventor: Sarah Spurgeon, Leicester (GB)

(73) Assignee: University of Leicester, Leicester (GB)

( * ) Notice: Subject to any disclaimer, the term of this patent is extended or adjusted under 35 U.S.C. 154(b) by 0 days.

(21) Appl. No.: 11/791,136

(22) PCT Filed: Nov. 17, 2005

(86) PCT No.: PCT/GB2005/004445

§ 371 (c)(1),
(2), (4) Date: Nov. 19, 2007

(87) PCT Pub. No.: WO2006/054093

PCT Pub. Date: May 26, 2006

(65) Prior Publication Data

US 2008/0059118 A1    Mar. 6, 2008

(30) Foreign Application Priority Data

Nov. 18, 2004    (GB) .................................. 0425458.7

(51) Int. Cl.
*G06F 11/30*    (2006.01)
(52) U.S. Cl. ..................... 702/185; 702/182; 702/183; 702/58; 702/4
(58) Field of Classification Search ............. 702/33–36, 702/57–58, 83–84, 179, 181–185; 703/6, 703/7; 438/14, 17
See application file for complete search history.

(56) References Cited

U.S. PATENT DOCUMENTS 5,216,342 A * 6/1993 Torii et al. ............... 318/568.1
5,988,848 A * 11/1999 Berstecher et al. ............ 700/28
6,902,378 B2 * 6/2005 Gaudet et al. .................. 417/27
2005/0049834 A1 * 3/2005 Bottomfield ................ 702/183
2007/0233427 A1 * 10/2007 Kaushal et al. ............. 702/183

OTHER PUBLICATIONS

Keng Boon Goh et al., Fault diagnostics using sliding mode techniques, Jun. 8, 2001, Control Engineering Practice 10 (2002), pp. 207-217.*

Wen Chen et al., Robust Fault Detection in Uncertain Nonlinear Systems via A Second Order Sliding Mode Observer, Dec. 2001, Proceedings of the 40th IEEE Conference on Decision and Control, pp. 573-578.*

Roy A. McCann et al., Application of a Sliding Mode Observer for Switched Reluctance Motor Drives, 1997, IEEE, pp. 525-532.*

(Continued)

*Primary Examiner*—Eliseo Ramos Feliciano
*Assistant Examiner*—Mi'schita' Henson
(74) *Attorney, Agent, or Firm*—Toler Law Group

(57) ABSTRACT

A diagnostics subsystem for performing predictive diagnostics on a machine such as a vacuum pump. The subsystem has one or more parameter sensors providing measurable data, a process model for modelling machine operation and generating at least one estimated operating parameter, a comparator for comparing the sensed operating parameter with the estimated operating parameter; discontinuous signal injection means for injecting a discontinuity into the model to maintain sliding mode operation in the model; and means for analyzing the discontinuous injection signal for trends indicative of a fault in the machine.

18 Claims, 10 Drawing Sheets

OTHER PUBLICATIONS

Kao, Minghui et al, "Engine Load and Equivalence Ratio Estimation for Control and Diagnostics via Nonlinear Sliding Observer," Powertrain Control Research Laboratory, Department of Mechanical Engineering, University of Madison, Wisconsin, USA, pp. 1574-1578.

Saif, Mehrdad, "Fault Diagnosis Based on Equivalent Control Concept," School of Engineering Science, Simon Fraser University, Vancouver, BC, Canada, pp. 423-427.

Krishnaswami, V. et al, "Application of Sliding Mode Observers to Automobile Powertrain Diagnostics," Center for Automotive Research, The Ohio State University, Columbus, Ohio, USA, pp. 355-330.

Jones, N.B. et al, "Aspects of Diagnostic Schemes for Biomedical and Engineering Systems," Department of Engineering, University of Leicester, Leicester, UK, pp. 357-362.

Bhatti, A.I. et al, "Engine Coolant System Fault Diagnostics with Sliding Mode Observers & Fuzzy Analyser," Department of Engineering, University of Leicester, Leicester, UK, pp. 273-276.

Edwards et al, Christopher, "Sliding Mode Observers for Fault Detection and Isolation," Control Systems research, Department of Engineering, University of Leicester, Leicester, UK, pp. 541-553.

Edwards et al, Christopher, "On the Development and Application of Sliding Mode Observers," Department of Engineering, University of Leicester, Leicester, UK, pp. 541-553.

\* cited by examiner

SLIDING MODE METHOD FOR PREDICTIVE DIAGNOSTICS

CLAIM OF PRIORITY

This application is a U.S. National Stage Application of and claims priority to International Application Number PCT/GB2005/004445; filed Nov. 17, 2005, which claims priority to United Kingdom Application No. 0425458.7, filed Nov. 18, 2004. International Application Number PCT/GB2005/004445 and United Kingdom Application No. 0425458.7 are expressly incorporated herein by reference in their entirety.

FIELD OF THE INVENTION

This invention relates to a diagnostics subsystem for performing predictive diagnostics on a machine such as a high-speed rotating machine. It is particularly useful in combination with a machine such as a vacuum pump.

BACKGROUND

As machines become more complex and valuable, there is a greater need to protect them, and the systems they support, from the consequences of breakdown. This is relevant in the semiconductor industry, for example, where machine failure can contribute to the loss of a very valuable batch of wafers. Dry vacuum pumps have been successfully used in the semiconductor industry. Nonetheless, the harsh nature in many semiconductor processes creates a challenge for condition monitoring of these systems (see Troup et al. (1988), Dry pumps operating under harsh conditions in the semiconductor industry, *Journal of Vacuum Sci. Technol*, Vol. 7, 2381-2386). Any diagnostic scheme should be able to operate under all conditions and be able to detect faults, creating an alarm to warn the user that maintenance must be conveniently scheduled before catastrophic loss occurs.

Sliding mode techniques have been used widely for fault detection schemes in recent years. Their main advantage is that they exhibit fundamental robustness against certain kinds of parameter variations. The design procedure is characterised by two phases: selection of an appropriate surface where the system will demonstrate desired dynamics and selection of an injection signal that will force the system to reach and maintain its sliding motion.

A number of engineering and biomedical applications have used sliding mode observers in order to recreate fault signals. Examples can be found in Jones et al. (2000), *Aspects of diagnostic schemes for biomedical and engineering systems*, IEE Proc.-Sci. Meas. Technol, Vol. 147, No. 6. A particular sliding mode observer for fault detection and isolation is described by Edwards et al. (1999), in *Sliding mode observers for fault detection and isolation*, Automatica, Vol. 36, 541-553. The novelty of the approach is that the observer attempts to reconstruct the fault signals rather than detect the presence of a fault through a residual signal. The proposed observer is designed to maintain the sliding motion, even in the presence of faults, which are detected by analysing the so-called equivalent output injection signal obtained from the discontinuous injection signal required to maintain sliding. The equivalent injection signal is thus not the injection signal applied to the observer but represents the injection required, on average, to maintain sliding motion. The equivalent injection signal can be readily obtained from by appropriate filtering of the applied, usually discontinuous, injection signal required. An alternative sliding mode observer scheme for monitoring is described in Hermans et al (1996), *Sliding mode observer for robust sensor monitoring*, Proceedings of the 13$^{th}$ IFAC World congress, pp. 211-216. In that document, a design approach is adopted whereby, when a fault occurs, the observer is disturbed from its surface and sliding ceases. However, the sliding mode control theory indicates such an approach is difficult to implement since the observer is designed in such a way in order to keep the system always in sliding motion. In addition, the choice of gain to maintain sliding motion from the theory is often conservative. Therefore, it is difficult to ensure a fault induces a break in sliding.

Many real, reliable sensors are not commercially or technically viable in corrosive, toxic, or high-temperature environments within rotating machines (e.g. inside a semiconductor process vacuum pump).

SUMMARY OF THE INVENTION

According to a first aspect of the present invention, a diagnostics subsystem is provided for performing predictive diagnostics on a machine, the subsystem comprising: at least one sensor for providing at least one sensed operating parameter of the machine; a process model for modelling operation of the machine and generating at least one estimated operating parameter, comparison means for comparing the sensed operating parameter with the estimated operating parameter; discontinuous signal injection means for injecting a discontinuity into the model to maintain sliding mode operation in the model in which the difference between the estimated operating parameter and the sensed operating parameter tends to zero; and analysis means for analysing the discontinuous injection signal for an indication or indications (e.g. a trend or trends) indicative of a fault in the machine.

There may be a number of sensors. The sensors give a set of sensed operating parameters, such as temperature in a pump and current in a pump motor. Other possible sensors can include: pressure or pressure difference; mass flow rate (e.g. measured by a fluid flow meter); vibration (as measured by an accelerometer); acoustic parameters measured using a microphone; and derivations of such parameters (e.g. noise spectrum frequency/distribution or deviation from normal noise spectrum). Preferably the process model generates a corresponding set of estimated operating parameters and the comparison means compares sensed operating parameters with corresponding estimated operating parameters.

The discontinuous signal injection means are arranged to generate an injection signal as a function of the sign of an output of the comparison means, and to thereby cause the difference between each sensed operating parameter and its corresponding estimated operating parameter to tend to zero in the sliding mode operation. The magnitude of the injection signal is not important, provided it is sufficiently large to keep the model in sliding mode.

The analysis means preferably comprise means for estimating a deviation (or alternatively a trend) in the discontinuous injection signal from a nominal level. The deviation from the nominal level may be a simple crossing of a pre-set threshold, but may alternatively be a statistically significant deviation.

In accordance with a second aspect of the invention, a pump is provided having at least one sensor for sensing an operating parameter of the pump and a diagnostics subsystem comprising: a process model for modelling operation of the pump and generating at least one estimated operating parameter including an inferred parameter, comparison means for comparing the sensed operating parameter with the estimated operating parameter; discontinuous signal injection means for injecting a discontinuity into the model to maintain sliding mode operation in the model in which the difference between the estimated operating parameter and the sensed operating parameter tends to zero; and analysis means for analysing the discontinuous injection signal for a deviation in the inferred parameter from a nominal value, which is an indication of a fault in the pump.

The analysis means are preferably arranged to identify a change in the discontinuous injection signal required to maintain sliding mode operation in the model and are arranged to generate a fault signal in response to such a change.

The invention in its preferred embodiment operates by using sliding mode observers designed to infer the values that would be obtained from real sensors, and therefore act as "virtual sensors" which can aid in machine diagnosis.

By these and other means described below, a model of elements within a generic vacuum pump is provided. The model is driven by readily available measurements and, by very specific sliding mode analysis of the process dynamics and use of a system of specifically defined driving signals, measures of the deviation in internal parameters of the pump from their nominal values are constructed.

A sliding mode observer is described that is used for parameter estimation and fault prediction using non-linear models of the vacuum pump dynamics and appropriate monitoring of the equivalent injection signal.

Preferred embodiments of the invention are now described, by way of example only, with reference to the accompanying drawings.

DETAILED DESCRIPTION OF THE PREFERRED EMBODIMENT

Figure 1:
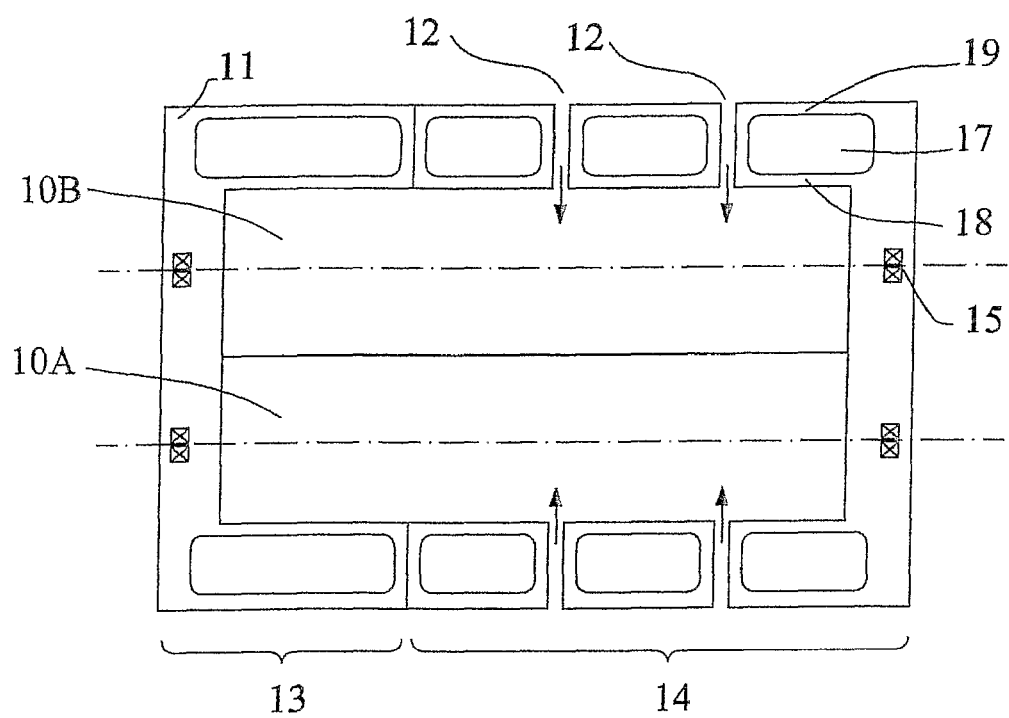
FIG. 1 is a cross sectional plan view of a screw pump for use with the present invention.
Figure 2:
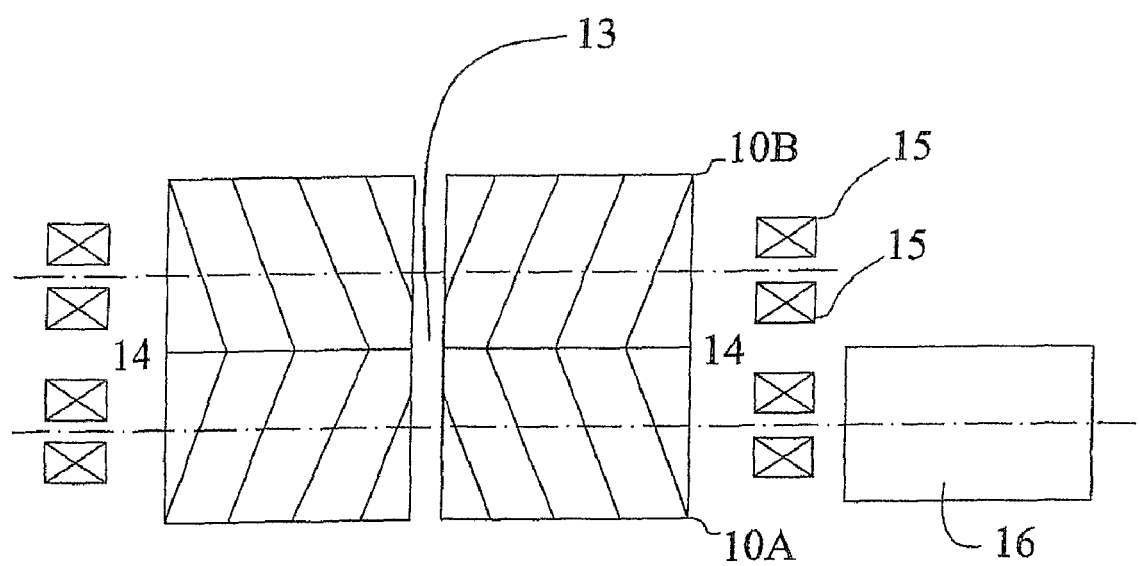
FIG. 2 is a schematic diagram of a double-ended screw pump for use with the present invention.

Referring to FIG. 1, a screw pump is illustrated having two rotors 10, provided within an outer housing 11 that serves as the stator of the pump. The rotors 10 are contra-rotating, intermeshing rollers having their central axis parallel to one another. The rotors are mounted through bearings 15 and are driven by a motor. Ports 12 are optionally provided having nozzles to allow cleaning fluid to be sprayed into the rotors. The pump has an inlet region 13 and an exhaust region 14. The housing 11 is formed of a two-layer skin, having an inner layer 18 and an outer layer 19, between which lies a cavity 17 extending over the entire length of the pump. FIG. 2 shows a double-ended version of a pump, also showing a driving motor 16.

In operation, the motor 16 drives the rotor 10A (shown lowermost in the diagrams), which in turn drives the contra-rotating rotor. Fluid (such as chemical vapor deposition (CVD) solvent for the semiconductor industry) is pumped from the inlet 13 to the exhaust 14 by the action of screw threads on the rotors. The temperature of the pump is kept under control by pumping of coolant through the cavity 17 to conduct heat away from the pump.

Figure 3:
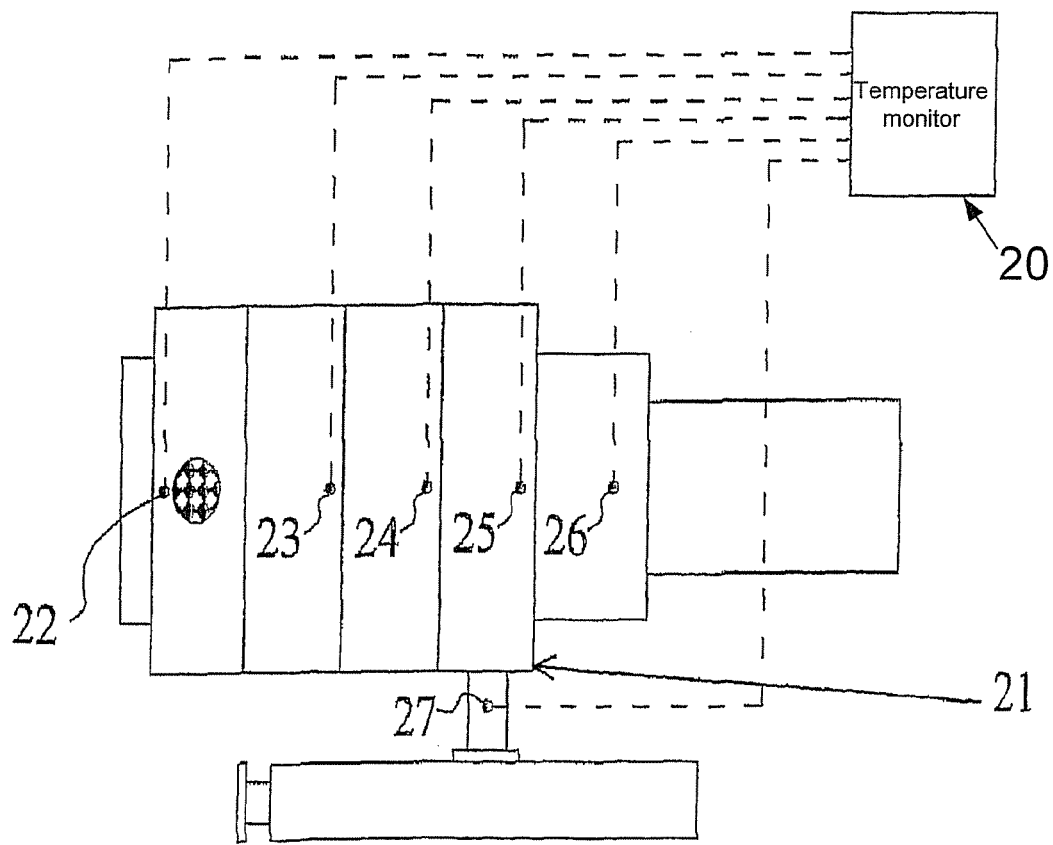
FIG. 3 is a schematic illustration of a side elevation of a pump such as that of FIG. 1 or FIG. 2.

Referring to FIG. 3, a set of temperature sensors 22, 23, 24 and 25 are shown at different stages along a pump 21. These are connected to a temperature monitor 20. The temperature sensors 22 to 25 monitor the temperature within the cavity 27 at different stages in the pump 21. A further temperature sensor 26 monitors temperature in the bearings 15 and a temperature sensor 27 monitors coolant outlet temperature.

The pump described is a screw pump enclosing two threaded rotors, but alternatively it may be a Northy ("claw") pump or a Roots pump.

The temperature sensors 22 to 27 may be simple thermocouple or thermistor sensors, and for reasons that will be explained, they need not be highly accurate and are therefore relatively inexpensive.

Figure 4:
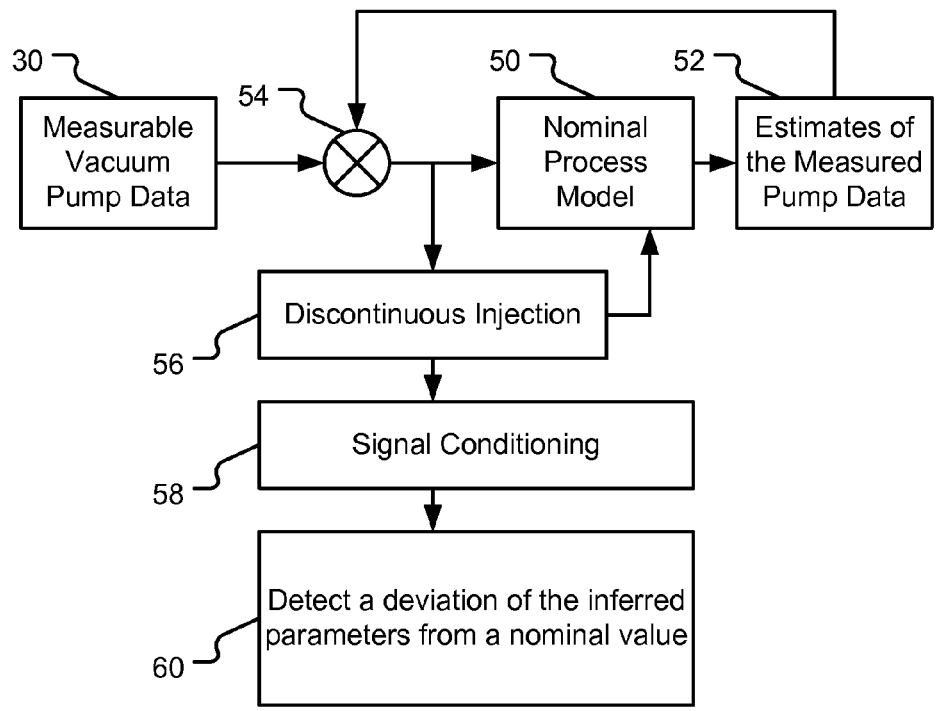
FIG. 4 is a block diagram illustrating the diagnostics subsystem of the present invention.

Referring now to FIG. 4, the temperature sensors 30 are shown as providing measurable vacuum pump data into a sliding mode diagnostics subsystem. The diagnostics subsystem comprises a nominal process model 50 that models the operation of the pump, the model having an output 52 that provides estimates of the measured pump data in accordance with the model. A comparator 54 compares these estimates 52 with the measurable vacuum pump data 30. The output from the comparator 54 is fed into the model 50 and also into a discontinuous injection module 56 that injects a discontinuous signal into the model 50. This injection signal causes the model 52 to operate in sliding mode, as will be described below. A signal conditioning module 58 monitors the same discontinuous injection signal from discontinuous injection module 56 (e.g. integrates it over time) and provides an output to estimator 60 that estimates a deviation from a nominal level and generates fault signals or alarms.

It is not necessarily contemplated that the fault signal might automatically control the pump or other machine, but this is an option. As an example, a fault indicative of a catastrophic condition or a condition that may be dangerous to the pump or the environment can be used to control the pump, e.g. slow it down or stop it, or to control ancillary equipment connected to the pump, e.g. close or open a valve.

The operation of the normal process model 50 and the discontinuous injection module 56 is now described mathematically.

If $p_{meas}$ is a readily measurable process parameter such as pump temperature and p is an estimate of that parameter generated by the nominal process model 50 and if $x_{nominal}(t)$ denotes those parameters which are constant under normal operation but are expected to deviate under faulty operating conditions, c denotes pump parameters that can be assumed to be constant and v is the applied discontinuous injection signal, then:

$$\frac{dp}{dt} = F(p, x_{nominal}(t), c, v)$$

-continued $$v = \frac{p - p_{meas}}{\|p - p_{meas}\|}$$

It can now be seen that where $x_{nominal}(t)$ deviates due to a fault, the discontinuous injection signal v will change in order to maintain the estimate p in the nominal process model. This change in v can be measured by signal conditioning module 58 and the resultant estimate of deviation from nominal in the unmeasureable process parameters is output as a possible fault, or may be programmed to cause the generation of an alarm signal.

Figure 5:
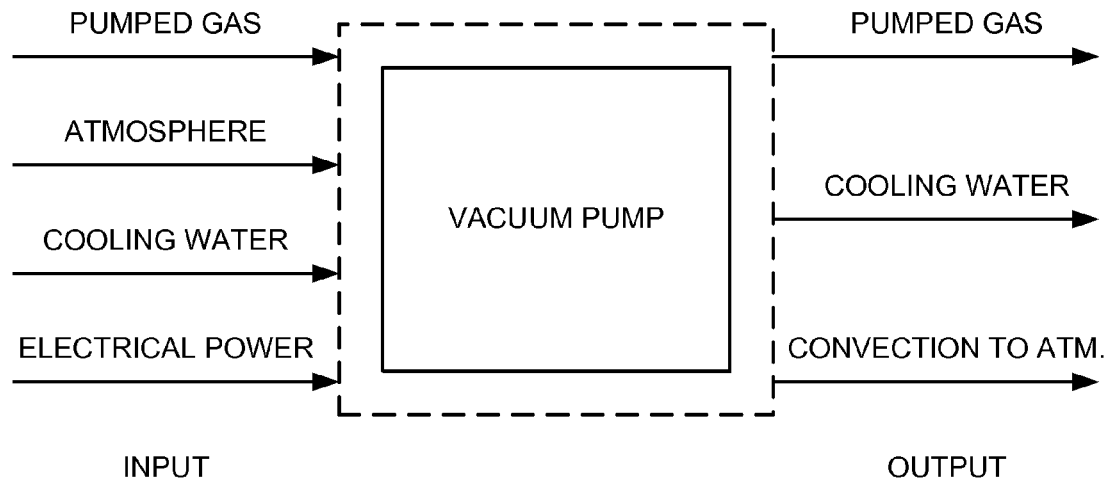
FIG. 5 is a simple block diagram showing the inputs and outputs of a vacuum pump.

A preferred embodiment of the invention is now described in greater detail with reference to FIG. 5, which represents the inputs and outputs of the vacuum pump.

Three mathematical models that describe the water-cooling system are derived from physical laws and verified through identification techniques. The system can be represented by means of a block diagram (see FIG. 5). The primary source of heat to the pump is the electrical power supply. Additionally, heat is exchanged between the pump and the atmosphere, the cooling water and pumped gas.

A heat transfer model previously developed for a diesel engine by Bhatti et al. described in *Engine coolant system fault diagnostics with sliding mode observers and fuzzy analyser*, IASTED International Conference on Modelling, Identification and Control, Innsbruck, Austria, 1999, is modified here. The rate of change of pump body temperature is given by:

$$(mc_p)_B \frac{dT_B}{dt} \approx Q_P - Q_{CW} - Q_{CONV} - Q_{RAD}$$

where Q denotes an instantaneous heat transfer rate. The instantaneous heat transfer rate of power $Q_P = kI$ is assumed to be a function of the inverter current I, where k is a constant. The cooling water heat transfer $$Q_{CW} = \dot{m}_c c_{pcw}(T_o - T_i)$$

the surface heat loss to ambient through convection $$Q_{CONV} = (hA)_B (T_B - T_{atm})$$

and the surface heat loss to ambient through radiation.

$$Q_{RAD} = \epsilon \sigma A_B (T_B^4 - T_{atm}^4)$$

Moreover, $m_B$ is the mass of the pump body and $c_{pB}$ is the specific heat capacity of the pump body. $T_B$, $T_i$, $T_o$ and $T_{atm}$ are the pump body, inlet, outlet and atmospheric temperatures respectively. Also, $A_B$ represents the surface area of the pump body, $h_B$ the heat transfer coefficient of the pump body, $\dot{m}_c$ the mass flow rate of coolant through pump, $c_{pcw}$ the specific heat capacity of the coolant, $\epsilon$ the surface emissivity and $\sigma$ the Steffen-Boltzmann constant.

Substituting for Q will result in the following equation:

$$(mc_p)_B \frac{dT_B}{dt} = kI - \dot{m}_c c_{pcw}(T_o - T_i) - (hA)_B (T_{B1} - T_{atm}) - \epsilon \sigma A_B (T_B^4 - T_{atm}^4)$$

By rearranging the relationship and assuming the radiation losses to be small:

$$\frac{dT_{B1}}{dt} = \frac{kI}{(mc_p)_B} - \frac{\dot{m}_c c_{pcw}}{(mc_p)_B}(T_o - T_i) - \frac{(hA)_B}{(mc_p)_B}(T_{B1} - T_{atm})$$

Re-labelling the coefficients for ease of exposition yields:

$$\dot{T}_{B1} = a_1 kI - a_2 \dot{m}_c (T_o - T_i) - a_3 (T_{B1} - T_{atm}) \quad (1)$$

where $a_1, a_2$ and $a_3$ are given by $a_1 = 1/(mc_p)_B$, $a_2 = c_{pcw}/(mc_p)_B$ and $a_3 = (hA)_B/(mc_p)_B$.

In equation (1), the rate of change of pump body temperature ($T_{B1}$) is parameterized in terms of the mass flow rate, but it can be also parameterized in terms of the heat transfer coefficient between the pump and the coolant $h_c$ ($T_{B2}$). This will result in:

$$\frac{dT_{B2}}{dt} = \frac{kI}{(mc_p)_B} - \frac{h_c A_c}{(mc_p)_B}(T_{B2} - T_o) - \frac{(hA)_B}{(mc_p)_B}(T_{B2} - T_{atm})$$

where $A_C$ is the surface area of the surrounding pipe-work. Hence, $$\dot{T}_{B2} = a_1 kI - a_4 h_c (T_{B2} - T_o) - a_3 (T_{B2} - T_{atm}) \quad (2)$$

where $a_4 = A_C/(mc_p)_B$.

Finally, the rate of change of the coolant temperature is given by:

$$(mc_p)_{cw} \frac{dT_o}{dt} = Q_C - Q_{CW} - Q_{CW}$$

where $$Q_C = h_c A_c (T_B - T_o)$$

is the pump body to coolant heat transfer and $$Q_{CW} = \dot{m}_c c_{pcw}(T_o - T_i)$$

the cooling water heat transfer. In addition, $m_{cw}$ is the mass of the coolant contained in the pump. Substituting the instantaneous heat transfer rate and rearranging:

$$\frac{dT_o}{dt} = \frac{h_c A_c}{(mc_p)_{cw}}(T_B - T_o) - \frac{\dot{m}_c c_{pcw}}{(mc_p)_{cw}}(T_o - T_i)$$

Therefore, renaming the coefficients gives:

$$\dot{T}_o = b_1 h_c (T_B - T_o) - b_2 \dot{m}_c (T_o - T_i) \quad (3)$$

where $b_1$ and $b_2$ are given by $b_1 = A_c/(mc_p)_{cw}$ and $b_2 = 1/m_{cw}$.

Equations (1)-(3) represent the dynamics of the cooling system. It is useful to consider the possible variation in the system parameters that may be used to indicate likely malfunction of the system: a variation in the coolant mass flow rate $\dot{m}_c$, a change in the heat transfer coefficient $h_c$ between the pump and coolant and a change in the heat transfer k between the pump and the temperature sensor. Let $$\dot{m}_c = \tilde{\dot{m}}_c + \Delta \dot{m}_c, \ h_c = \tilde{h}_c + \Delta h_c \text{ and } k = \tilde{k} + \Delta k$$

where $\Delta\dot{m}_c, \Delta h_c, \Delta k$ represent the deviations and $\tilde{m}_c, \tilde{h}_c, \tilde{k}$ the nominal parameters. Substituting the above in equations (1), (2) and (3) gives:

$$\dot{T}_{B1} = a_1 I(\tilde{k}+\Delta k) - a_2 T_o(\tilde{m}_c+\Delta \dot{m}_c) + a_2 T_i(\tilde{m}_c+\Delta \dot{m}_c) - a_3 T_{B1} + a_3 T_{atm} \quad (4)$$

$$\dot{T}_{B2} = a_1 I(\tilde{k}+\Delta k) - a_4 T_{B2}(\tilde{h}_c+\Delta h_c) + a_4 T_o(\tilde{h}_c+\Delta h_c) - a_3 T_{B2} + a_3 T_{atm} \quad (5)$$

$$\dot{T}_o = b_1 T_B(\tilde{h}_c+\Delta h_c) - b_1 T_o(\tilde{h}_c+\Delta h_c) - b_2 T_o(\tilde{m}_c+\Delta \dot{m}_c) + b_2 T_i(\tilde{m}_c+\Delta \dot{m}_c) \quad (6)$$

It can be observed that by setting the deviations $\Delta\dot{m}_c, \Delta h_c, \Delta k$ to zero in the above equations a nominal cooling system dynamics can be obtained.

The sliding mode observer considered for the purposes of the present invention is used for parameter estimation and hence fault prediction of the cooling water system. Therefore, the sliding surface has been chosen to be the error between the observer (model) output and the plant (pump) output. The output of the comparator 54 (the error signal) is input to the discontinuous injection module 56, which generates an injection signal (which may comprise multiple components, described in greater detail below) as a function of the sign of the error, to adjust the state of the model to cause the error to tend to zero. It will be illustrated that the sliding motion will be attained even in the presence of a fault and the resulting equivalent injection signal will be used to reconstruct the model parameters.

The proposed observer has been modified from Goh et al. (2002), *Fault diagnostics using sliding mode techniques*, Control Engineering Practice, Vol. 10, 207-217 and has the following structure:

$$\hat{\dot{T}}_{B1} = -a_3 \hat{T}_{B1} + a_1 \tilde{k} I - a_2 \tilde{m}_c T_o + a_2 \tilde{m}_c T_i + a_3 T_{atm} + v_{B1} \quad (7)$$

$$\hat{\dot{T}}_{B2} = -(a_4 \tilde{h}_c + a_3) \hat{T}_{B2} + a_1 \tilde{k} I + a_4 \tilde{h}_c T_o + a_3 T_{atm} + v_{B2} \quad (8)$$

$$\hat{\dot{T}}_o = -(b_1 \tilde{h}_c + b_2 \tilde{m}_c) \hat{T}_o + b_1 \tilde{h}_c T_B + b_2 \tilde{m}_c T_i + v_o \quad (9)$$

where $v_i = K_i(\epsilon_i/\|\epsilon_i\| + \delta)$, $i = B1, B2, o$ and $K_i$ are the gains of the discontinuous signals $v_i$. Moreover, the $\epsilon_i$ is the observer error defined as the difference between the estimated and measured temperatures (i.e. $\epsilon_{B1} = T_{B1} - \hat{T}_{B1}$, $\epsilon_{B2} = T_{B2} - \hat{T}_{B2}$ and $\epsilon_o = T_o - \hat{T}_o$). The selection of $K_i$ must be such that the reachability problem is satisfied and the sliding motion is sustained at all times. Finally, $\delta$ is the usual small positive constant used to reduce 'chattering', see Edwards et al. (1998), *Sliding Mode Control: Theory and Application*, Taylor and Francis, UK.

The following equations yield the observer error dynamics:

$$\dot{\epsilon}_{B1} = -a_3 \epsilon_{B1} + a_1 \Delta k I - a_2 \Delta \dot{m}_c (T_o - T_i) - v_{B1} \quad (10)$$

$$\dot{\epsilon}_{B2} = -(a_4 \tilde{h}_c + a_3) \epsilon_{B2} + a_1 \Delta k I - a_4 \Delta h_c T_{B2} + a_4 \Delta h_c T_o - v_{B2} \quad (11)$$

$$\dot{\epsilon}_o = -(b_1 \tilde{h}_c + b_2 \tilde{m}_c) \epsilon_o - (b_1 \Delta h_c + b_2 \Delta \dot{m}_c) T_o + b_1 \Delta h_c T_B + b_2 \Delta \dot{m}_c T_i - v_o \quad (12)$$

Assuming the $K_i$ are chosen sufficiently large, a sliding mode will be attained and maintained. The observer errors and their derivatives will converge to zero due to the choice of sliding surface. Thus, the sliding mode equations (10), (11) and (12) become:

$$0 = a_1 \Delta k I - a_2 \Delta \dot{m}_c (T_o - T_i) - v_{B1} \quad (13)$$

$$0 = a_1 \Delta k I - a_4 \Delta h_c T_{B2} + a_4 \Delta h_c T_o - v_{B2} \quad (14)$$

$$0 = -(b_1 \Delta h_c + b_2 \Delta \dot{m}_c) T_o + b_1 \Delta h_c T_B + b_2 \Delta \dot{m}_c T_i - v_o \quad (15)$$

Equations (13), (14) and (15) demonstrate that the observer provides a means of detecting changes in system parameters.

It can also be observed that the system parameters are interdependent and more than one injection signal must be utilised to perform fault diagnosis. The idea is illustrated in Table 1 below:

TABLE 1

| | Fault conditions | | |
|---|---|---|---|
| | Average Value of Injection Signal | | |
| Fault Condition | $v_{B1}$ | $v_{B2}$ | $v_o$ |
| $\Delta\dot{m}_c$ | Non-zero | 0 | Non-zero |
| $\Delta h_c$ | 0 | Non-zero | Non-zero |
| $\Delta k$ | Non-zero | Non-zero | 0 |
| Normal Condition | 0 | 0 | 0 |

$v_{B1}$, $v_{B2}$ and $v_o$ are different injection signals injected to keep the model in sliding mode. If the first row of results is obtained (i.e. the first and third signals show significant value deviations from nominal), this is indicative of a mass flow rate problem, for example a valve problem or a blockage. If the second row of results is obtained (the first and second signals exceed their thresholds) this is indicative of a pump/coolant heat transfer problem—i.e. something getting too hot (or conceivably something getting unexpectedly cool). If the third row of results is obtained, this is indicative of abnormal pump/sensor heat transfer.

Thus, a truth table can be constructed for these or other parameters to diagnose more than one fault condition from several injection signals, and logic circuitry or processing can be used to diagnose the conditions.

A dry vacuum pump was tested under laboratory conditions. Temperature sensors were fitted on the vacuum pump in order to deliver status information. The motor current was also captured from the system's inverter via a serial link.

dSPACE (Digital Signal Processing and Control Engineering) a suitable hardware interface. It provides all the tools needed for real-time data acquisition and direct data exchange with Matlab/Simulink. Finally, a digital low pass filter was employed to remove the high frequency components.

In order to replicate the changes in system parameters that may occur prior to pump failure, three different experimental scenarios were considered. A low flow or total coolant failure will result in high temperatures in the motor, stator and the bearings. These high temperatures will affect the vacuum pump and can result in total failure. In order to simulate this type of fault the control valve was used to restrict the water flow. Secondly, a reduction in the rate of heat transfer from pump to coolant which can be caused by deposits on the coolant flow pipe-work is investigated. This type of fault was simulated by inserting an insulating material between the vacuum pump and the pipe-work. The last type of fault examined was a change in the heat transfer between the pump and the temperature sensor. For example additional heat generated by bearing friction. The fault was simulated by fitting a heater externally on the bearings.

Some results are now described with reference to FIGS. 6 to 11. These results show the behavior of observer $T_{B1}$ under normal operating conditions.

Figure 6:
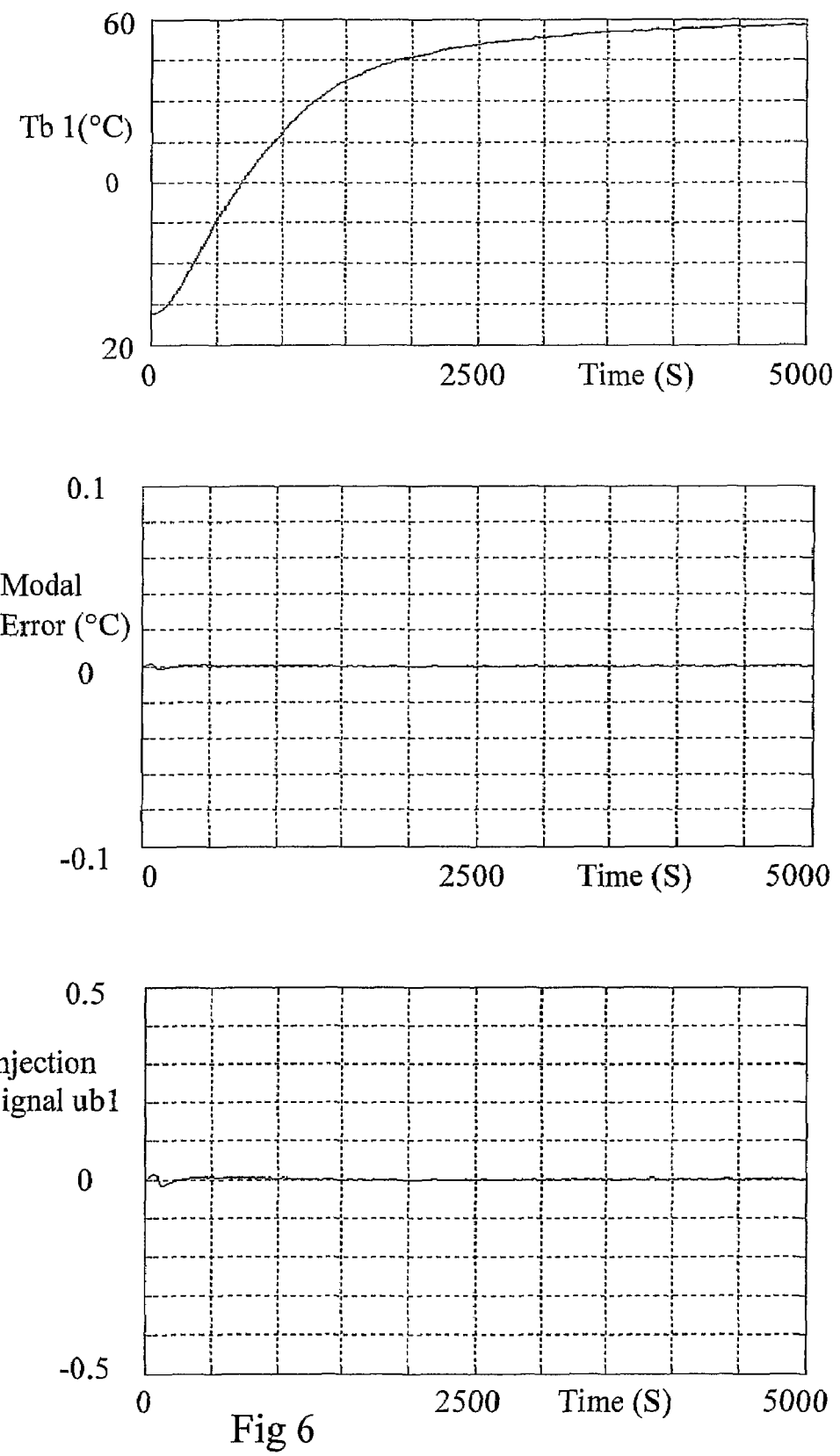
FIG. 6 shows graphs of measured and estimated body temperature $T_{B1}$, model error and corresponding equivalent injection signal in laboratory experiments.

In FIG. 6, the first graph represents a plot of the measured and the estimated data from the sliding mode observer. It can be noticed from the second graph that the observer tracks the temperature data very well and that the corresponding error between them is of the order of 0-0.002° C. The third graph represents the equivalent injection signal $\upsilon_{B1}$. Note that it is not affected and remains close to zero under normal operating conditions.

Figure 7:
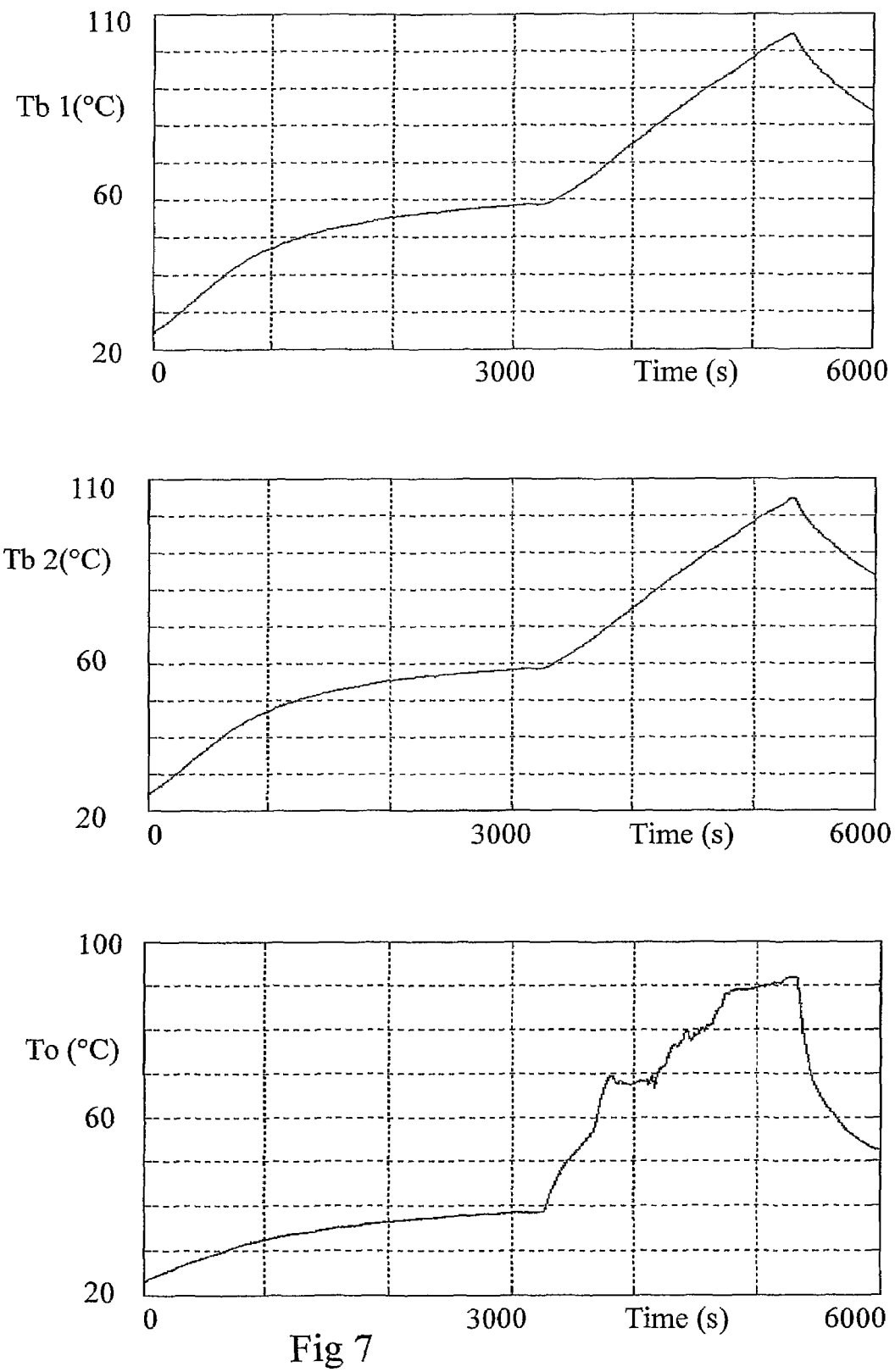
FIG. 7 shows measured and estimated data under a fault condition for observers $T_{B1}$, $T_{B2}$ and $T_o$ in laboratory experiments.

Referring to FIG. 7, this figure shows measured and estimated data under a fault condition for observers $T_{B1}$, $T_{B2}$ and $T_o$ in laboratory experiments. It can be seen that at approximately 3200 seconds a fault in the coolant mass flow rate $\dot{m}_c$ is introduced by restricting the water flow. Nevertheless, all the three observers attain a sliding motion even in the presence of the fault.

Figure 8:
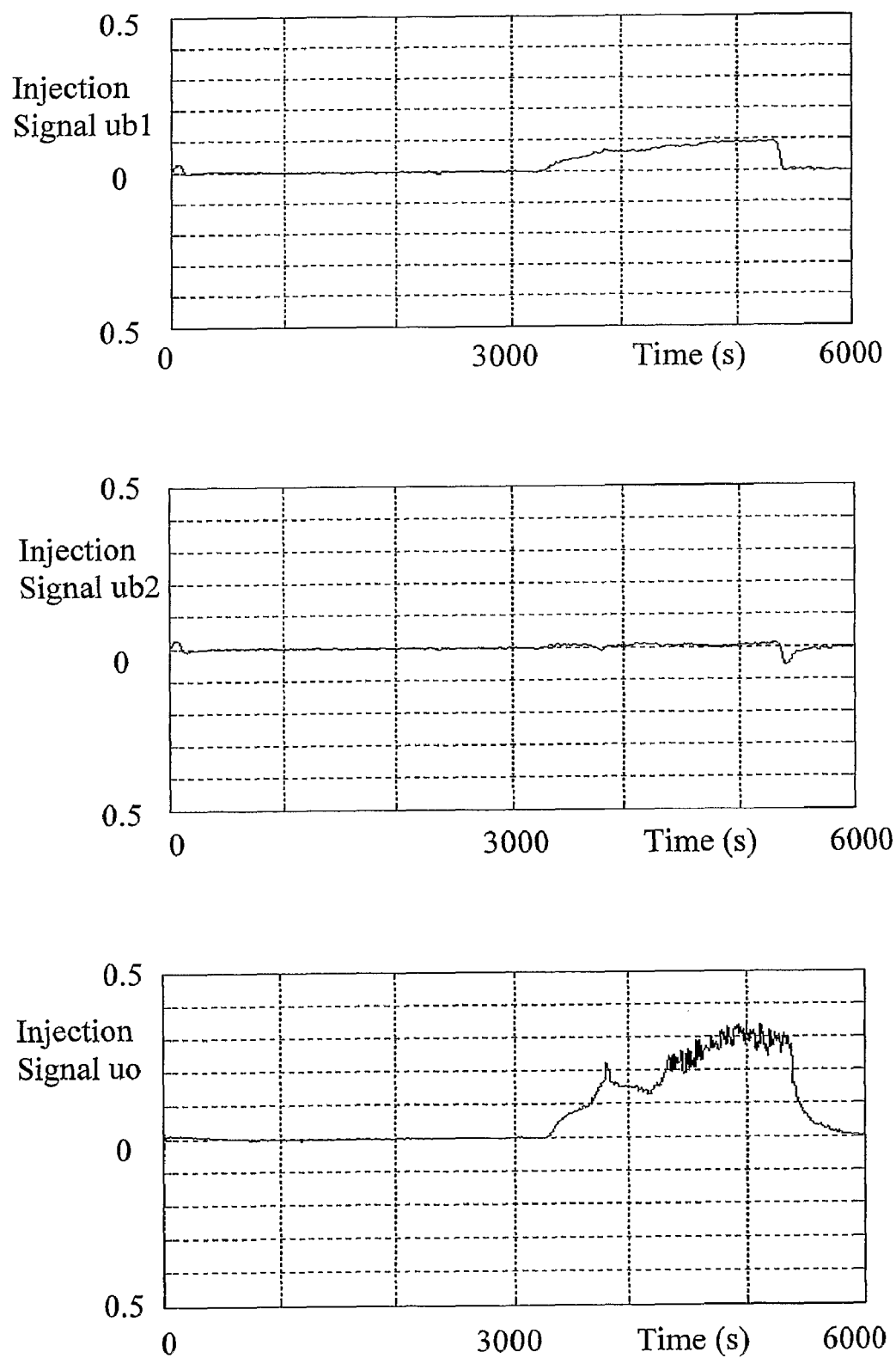
FIGS. 8 and 9 illustrate, respectively, the equivalent injection signals for the three observers and the component parameter estimate $\Delta \dot{m}_c$ in the first fault condition.
Figure 9:
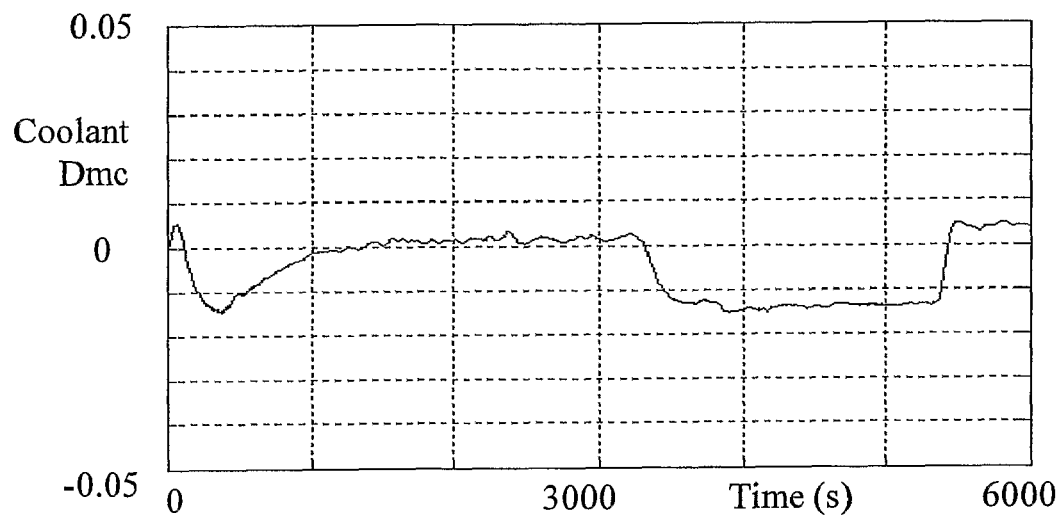
Figure 9:
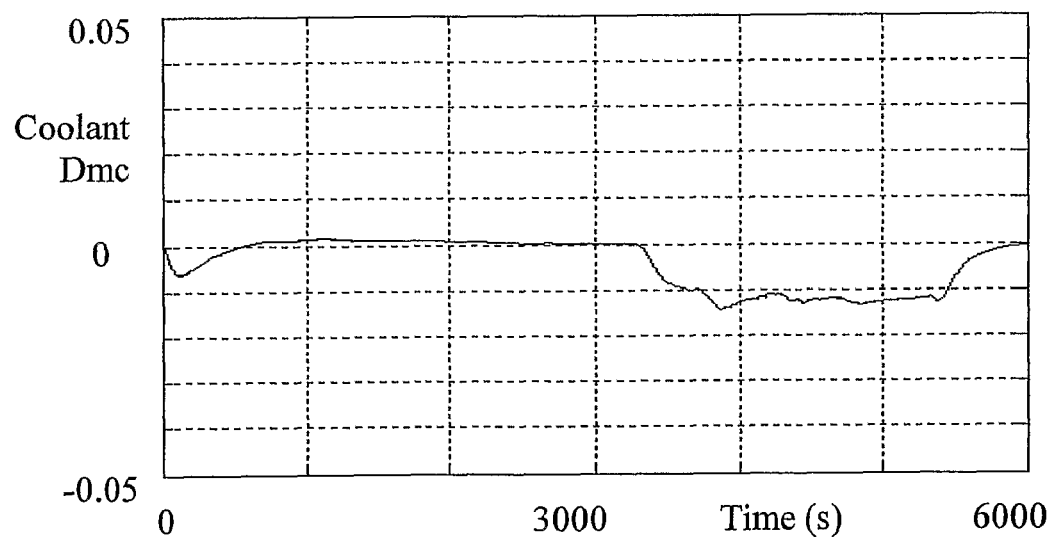

FIG. 8 shows the injection signals $\upsilon_{B1}$, $\upsilon_{B2}$ and $\upsilon_o$ for coolant flow failure, while FIG. 9 shows component parameter estimate $\Delta\dot{m}_c$ for observers $T_{B1}$ and $T_o$. The proposed diagnostic technique indicates that the parameters are interdependent so that the diagnostic system must detect non-zero values in more than one injection signal to infer a fault. As predicted, signals $\upsilon_{B1}$ and $\upsilon_o$ are affected, whereas $\upsilon_{B2}$ is largely unaffected. Also, good correlation between the estimates of $\Delta\dot{m}_c$ is observed.

Figure 10:
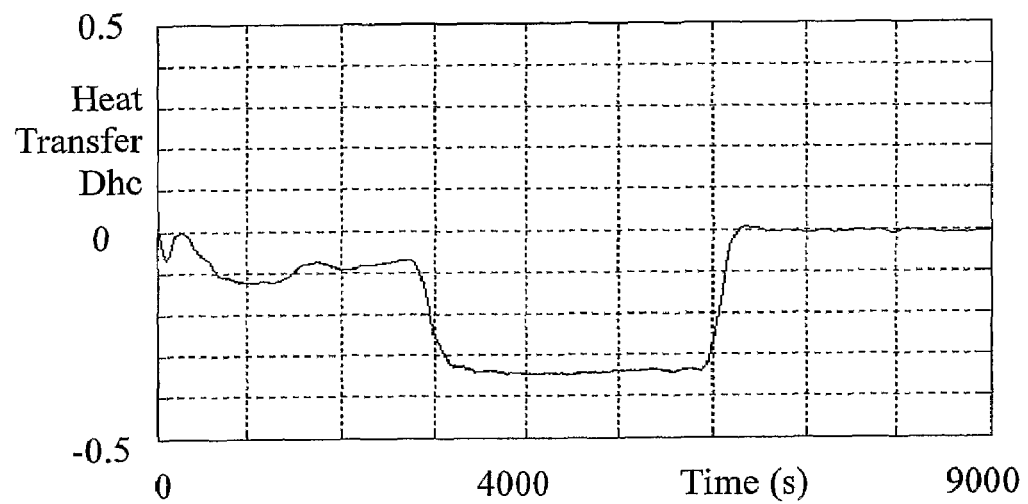
FIG. 10 shows component parameter estimate $h_c$ for observers $T_{B2}$ and $T_o$ in a second fault condition.
Figure 10:
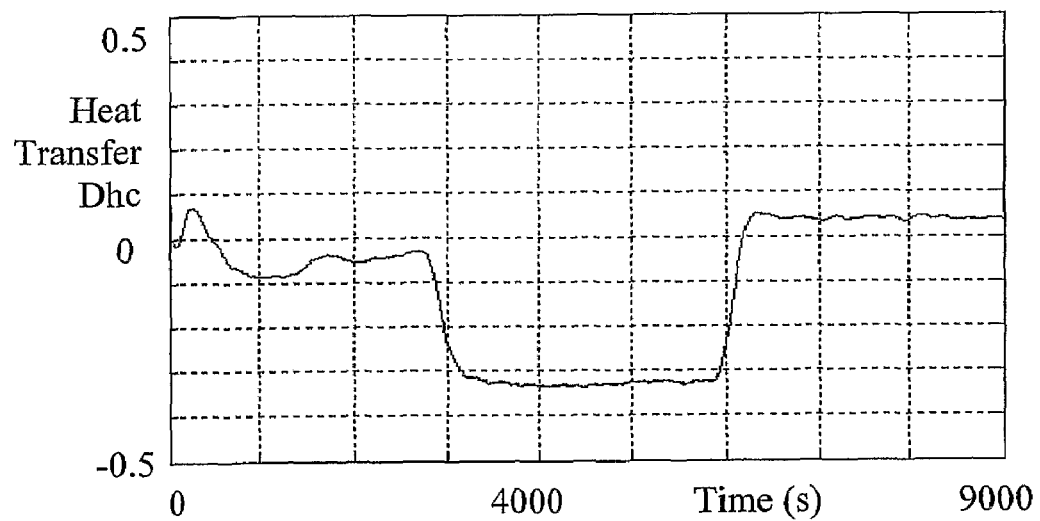
Figure 11:
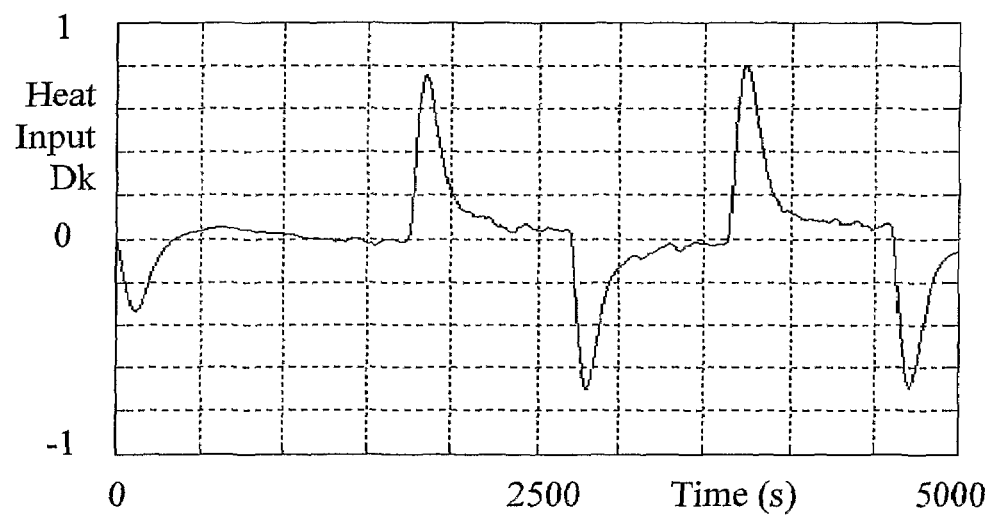
FIG. 11 shows component parameter estimate $\Delta k$ for observers $T_{B1}$ and $T_{B2}$ in a third fault condition.
Figure 11:
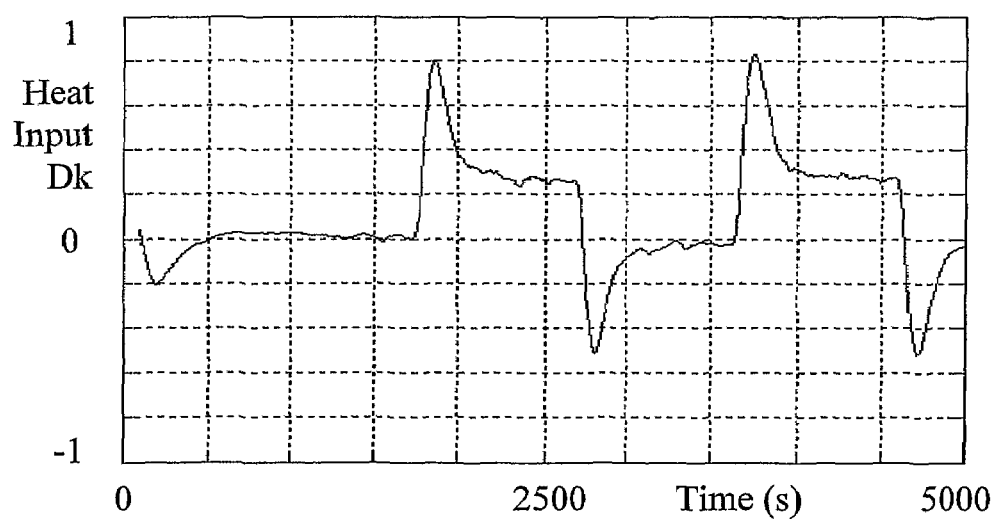

FIGS. 10 and 11 show the non-zero parameter estimates for the remaining two fault situations. In FIG. 10, a change in the heat transfer coefficient $h_c$ between the pump and coolant is introduced at approximately 2800 seconds. It can be seen that both observers reconstruct this change successfully. In FIG. 11, a change in the heat transfer k between the pump and the temperature sensor is introduced by the addition of approximately 120 W at 1700 and 3500 seconds respectively.

FIGS. 9 and 10 show the non-zero parameter estimates for the remaining two fault situations. FIG. 9 shows the injection signals $\upsilon_{B1}$, $\upsilon_{B2}$ and $\upsilon_o$ for coolant flow failure, while FIG. 10 shows component parameter estimate $\Delta\dot{m}_c$ for observers $T_{B1}$ and $T_o$. A change in the heat transfer coefficient $h_c$ between the pump and coolant is introduced at approximately 2800 seconds. It can be seen that both observers reconstruct this change successfully. Moreover, a change in the heat transfer k between the pump and the temperature sensor is introduced by the addition of approximately 120 W at 1700 and 3500 seconds respectively.

It has been shown that, when using a sliding mode approach, parameter estimation and hence fault prediction can be achieved by examining the associated equivalent injection signal. The method adopted here was successfully employed in a dry vacuum pump. The results show good correlation between the system parameter estimates obtained from the different observers. Early detection of faults is possible. Further, the suggested fault diagnostic technique provides a cost-effective approach which requires only minimal transducer information.

The technique described and claimed can be used to augment existing condition monitoring tools that are implemented on vacuum pumps. Measurements from inexpensive and readily available existing transducers can be taken and used to construct estimates of internal parameters of the machine. These internal parameters are impractical to measure using existing transducers and knowledge of the variation in such parameters is critical to predictive diagnostics relating to the health of the machine. By detailed modelling of the vacuum pump and the appropriate equivalent injection analysis, very accurate estimates of these internal parameters can be obtained.

The invention claimed is:

1. A diagnostics subsystem for performing predictive diagnostics on a machine, the subsystem comprising:

a set of sensors providing a set of sensed operating parameters of the machine;
a process model to:
generate a set of estimated operating parameters, wherein each estimated operating parameter corresponds to one of the set of sensed operating parameters; and
generate an inferred parameter;
a comparator to provide a set of comparator outputs, each comparator output corresponding to one of the set of sensed operating parameters and the corresponding estimated operating parameter, wherein each comparator output is based on a difference between the corresponding sensed operating parameter and the corresponding estimated operating parameter;
discontinuous signal injection means for generating a set of discontinuous injection signals in response to the set of comparator outputs, and for injecting the set of discontinuous injection signals into the process model to maintain sliding mode operation in the process model wherein a difference between each sensed operating parameter and the corresponding estimated operating parameter tends to zero; and
an estimator to analyze the set of discontinuous injection signals to detect a deviation of the inferred parameter from a nominal value, wherein the estimator does not infer a fault when detecting a non-zero value in less than two of the set of discontinuous injection signals, and wherein the estimator infers a fault when detecting a non-zero value in at least two of the set of discontinuous injection signals.

2. A diagnostics subsystem in accordance with claim 1, wherein the estimator is to analyze a first discontinuous injection signal of the set of discontinuous injection signals to detect a trend indicative of a fault.

3. A diagnostics subsystem in accordance with claim 1, wherein a first sensor of the set of sensors senses temperature in the machine.

4. A diagnostics subsystem in accordance with claim 3, wherein a second sensor of the set of sensors senses pump motor current.

5. The diagnostics subsystem of claim 1, further comprising logic to infer a first fault associated with detection of non-zero values associated with each of a first pair of injection signals, and to infer a second fault associated with detection of non-zero values associated with each of a second pair of injection signals.

6. The diagnostics subsystem of claim 5, wherein the first fault is associated with the inferred parameter, and the second fault is associated with another inferred parameter that is associated with another measurable parameter related to machine operation.

7. The diagnostics subsystem of claim 1, wherein the inferred parameter is distinct from each estimated operating parameter, and wherein the inferred parameter is distinct from each sensed operating parameter.

8. A pump comprising:
a set of sensors to sense a set of sensed operating parameters associated with the pump; and
a diagnostics subsystem including:
a process model for generating a set of estimated operating parameters, wherein each estimated operating parameter corresponds to one of the set of sensed operating parameters;
a comparator to provide a set of comparator outputs, wherein each comparator output is based on a difference between an estimated operating parameter of the set of estimated operating parameters and the corresponding sensed operating parameter;

signal injection means for injecting a set of injection signals into the process model to maintain sliding mode operation in the process model wherein a corresponding difference between each estimated operating parameter and the corresponding sensed operating parameter tends to zero in response to injecting the set of injection signals, wherein each injection signal of the set of injection signals is determined based at least in part on a corresponding comparator output; and an estimator for analyzing the set of injection signals to detect a fault in the pump, wherein the estimator is configured to generate a fault signal in response to a non-zero value of at least two injection signals.

9. The pump of claim 8, wherein the estimator comprises logic to generate a selected one of a plurality of fault signals in response to a non-zero value of two of the set of injection signals.

10. The pump of claim 8, further comprising control means for controlling the pump in response to the detected fault.

11. The pump of claim 8, wherein the estimator comprises means for inferring a first fault when detecting a non-zero value in each of a first pair of injection signals.

12. The pump of claim 11, further comprising logic means for inferring a second fault when detecting a non-zero value in each of a second pair of injection signals.

13. The pump of claim 8, wherein the set of sensors comprises a set of temperature sensors to provide one or more sensed operating temperatures, wherein the process model generates corresponding estimated operating temperatures and the comparator compares each sensed operating temperature with the corresponding estimated operating temperature.

14. A method of performing predictive diagnostics on a machine, the method comprising:

measuring a set of measurable operating parameters of the machine with a set of sensors;

generating a set of estimated operating parameters, wherein each estimated operating parameter of the set of estimated operating parameters has a corresponding measurable operating parameter of the set of measurable operating parameters;

providing a set of comparator outputs, wherein each comparator output of the set of comparator outputs represents a difference between an estimated operating parameter and the corresponding measurable parameter;

injecting a set of discontinuities into a process model to maintain sliding mode operation in the process model wherein a difference between each estimated operating parameter and the corresponding measurable operating parameter tends to zero; and analyzing the set of discontinuities to detect an indication of a fault in the machine, wherein analyzing comprises inferring a fault when detecting a non-zero value of two or more of the injected discontinuities.

15. The method of claim 14, further comprising inferring different faults from detection of different combinations of values in the set of injected discontinuities, wherein a first fault is associated with a first corresponding set of values of the set of injected discontinuities and a second fault is associated with a second corresponding set of values of the set of injected discontinuities.

16. The method of claim 14, wherein measuring the set of operating parameters comprises determining a set of temperatures, and wherein generating the set of estimated operating parameters comprises generating a set of estimated temperatures.

17. A diagnostic system comprising:

a process model that includes a plurality of estimated operating parameters that are unmeasured, each estimated operating parameter corresponding to one of a plurality of measured operating parameters associated with a physical system;

a comparator to provide a plurality of comparator outputs, wherein each comparator output is based on a difference between one of the estimated operating parameters and the corresponding measured operating parameter;

a signal injector to inject a plurality of signals into the process model to cause a difference between each estimated operating parameter and the corresponding measured operating parameter to tend to zero, wherein each injected signal has a corresponding signal magnitude that is determined based on a corresponding comparator output; and an analysis module to detect a fault in the physical system by analyzing one or more of the plurality of injected signals, wherein the analysis module detects a fault when at least two injected signals have corresponding signal magnitudes that are non-zero.

18. The diagnostic system of claim 17, wherein one of the measured operating parameters comprises a temperature.

* * * * *